Patented July 14, 1936

2,047,910

UNITED STATES PATENT OFFICE 2,047,910

MORDANT-DYEING MONOAZO DYE AND ITS PRODUCTION

Max Raeck, Dessau in Anhalt, Germany, assignor to General Aniline Works, Inc., New York, N. Y., a corporation of Delaware No Drawing. Application October 5, 1935, Serial No. 43,782. In Germany December 18, 1934

2 Claims. (Cl. 260—91)

My present invention relates to a process for manufacturing a new monoazo dye and to the dye obtainable according to this process.

In German Patent No. 157,786 there are described mordant-dyeing monoazo dyes, made by coupling an ortho-aminophenol sulfonic acid or a substitution product thereof with 1,5-dihydroxynaphthalene.

This invention consists in the manufacture of a dye by coupling the hitherto unknown diazotized 3,4,6-trichloro-2-amino-1-hydroxybenzene-5-sulfonic acid with 1,5-dihydroxynaphthalene. This dye, dyed on wool and after-chromed, yields a black which, as compared with the hitherto known black, is characterized by a very fine shade and much improved fasteness to light as well as having good general properties of fastness.

Diazotized 3,4,6-trichloro-2-amino-1-hydroxybenzene-5-sulfonic acid may be obtained as follows:—3,4,6-trichloro-2-amino-1-hydroxybenzene is converted, by means of phosgene, into the benzoxazolone. This is sulfonated, whereby the sulfo group enters the vacant 5-position and the oxazole ring is saponified.

The following example illustrates the invention:—

29.25 parts of 3,4,6-trichloro-2-amino-1-hydroxybenzene-5-sulfonic acid are diazotized in the usual manner and the diazo compound is added to an ice-cold magna, made by stirring with water a paste of 16 kilos of 1,5-dihydroxynaphthalene. Caustic soda lye is then added until the reaction is feebly alkaline, whereupon coupling occurs and is rapidly at an end; the excess of caustic soda lye is neutralized with hydrochloric acid, the dye is filter-pressed and dried. It dyes wool in an acid bath dull violet-red. When after-chromed the shade becomes a full bloomy black.

What I claim is:—

1. The process which comprises diazotizing 3,4,6 - trichloro-2-amino-1-hydroxybenzene-5-sulfonic acid and coupling the diazo compound with 1,5-dihydroxynaphthalene.

2. The dye which corresponds to the formula

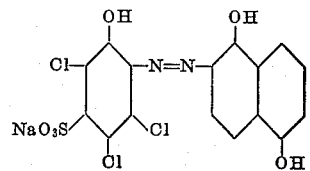

which dyes wool in an acid bath a dull violet-red shade which when after-chromed, becomes a full bloomy black.

MAX RAECK.